United States Patent Office 3,234,170
Patented Feb. 8, 1966

3,234,170
ALKYLARYL-POLYETHYLENEGLYCOLS AS ANTI-STATIC AGENTS FOR POLYETHYLENE
Walter Stumpf and Konrad Rombusch, Marl, Germany, assignors to Chemische Werke Huls Aktiengesellschaft, Marl, Germany, a corporation of Germany
No Drawing. Filed Nov. 16, 1962, Ser. No. 238,283
Claims priority, application Germany, Nov. 17, 1961, C 25,533
2 Claims. (Cl. 260—33.2)

It has been proposed to incorporate alkylaryl- or cycloalkylaryl-polyethyleneglycols into polyethylene in order to protect the latter as far as possible from becoming electrically charged while increasing simultaneously its sliding ability, a characteristic which is important for ease of manufacture. The method disclosed by the British Patent No. 731,728 limits the quantity which can be added to .001 to .2% of the polyethylene because larger ratios, in various instances even ratios of .1 to .2%, will exude, producing an oily layer at the surface of the objects. The compatible quantities are much too small to produce a satisfactorily anti-electrostatic effect, especially since the effect which can be accomplished will appear only several days after the manufacture of the objects and dust will be attracted and will accumulate during this time. On the other hand, larger quantities of additions are not feasible because oily surfaces will accumulate a great amount of dust and give rise to a tendency to adhere which is particularly disadvantageous in case of foils. Furthermore, the industrial polyethyleneglycolethers must be freed first from low-boiling components—a costly process—in order to avoid the formation of bubbles in objects made of polyethylene and containing these ethers.

Therefore, the technologically important problem of making polyethylene anti-electrostatic has not been solved heretofore by the proposed alkylaryl- and cycloalkylaryl-polyethyleneglycols.

It has been found that it is possible to make polyethylene—with or without additions such as stabilizers, coloring matter, lubricants, softeners, extenders, organic or inorganic pigments and filling material anti-electrostatic by surface treatment with, or incorporation of .5 to 10, preferably 2 to 5 percent by weight relative to the polyethylene, of one or more alkylarylethylene- or polyethyleneglycols of the formula

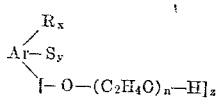

wherein

Ar is an aromatic, mono- or poly-nuclear hydrocarbon residue,
R is a poly-branched alkyl residue,
$x$ is the number of the poly-branched alkyl residues R,
S is any substituent which differs from R,
$y$ is the number of the substituents S,
$n$ is a number from 1 to 3000, and
$z$ is the number of the ethyleneglycol- or polyethyleneglycol chains, and the sum
$x+y+z$ equals, at the most, the number of substitutable atoms of the aromatic hydrocarbon residue Ar, either by itself or in mixture with other anti-electrostatically effective substances.

Suitable aromatic hydrocarbon residues Ar are either the residue derived from benzene, or residues derived from polynuclear aromatics such as naphthalene, anthracene, phenanthrene, pyrene, chrysene, diphenyl, terphenyl as well as diphenylmethane and 2,2 diphenylpropane.

Suitable values of R are the poly-branched aliphatic, saturated alkyl residues containing up to 12 carbon atoms and which have at least two, preferably at least three tertiary and/or quaternary carbon atoms. For example, the following alkl residues were found to be suitable:

1,2-dimethyl-propyl-,
1,2,2-trimethylpropyl-,
1,1,2-trimethylpropyl-,
1,2-dimethyl-butyl-,
1,3-dimethyl-butyl-,
2,3-dimethyl-butyl-,
1,2,3-trimethyl-butyl-,
1,2,2,3-tetramethyl-butyl-,
1,2,3,3-tetramethyl-butyl-,
2,2,3-trimethyl-butyl-,
2,2,3,3-tetramethyl-propyl-,
2-methyl-1-ethyl-propyl-,
1,2-dimethyl-1-ethyl-propyl-,
1,2,2-trimethyl-1-ethyl-propyl-,
2,4,4-trimethyl-pentyl-,
1,1,3,3-tetramethyl-butyl-,
2,2-dimethyl-1-isopropyl-propyl-,
1,3,5-trimethyl-hexyl-,
2,4-dimethyl-1-ethyl-pentyl-,
1,3-dimethyl-1-propyl-butyl-,
4-methyl-2-propyl-pentyl-,
4,6-dimethyl-heptyl-,
4,4-dimethyl-2-(2',2'-dimethylpropyl)pentyl-,
1,3,3-trimethyl-1-(2',2'-dimethylpropyl)-butyl-,
2,4,4-trimethyl-1-tert.-butyl-pentyl-,
2,4,4,6,6-pentamethyl-heptyl-,
1,1,3,3,5,5-hexamethyl-hexyl and
2,2,4,4-tetramethyl-1-isopropyl-pentyl.

Suitable as a substituent S which is different from R are: the methyl group, also the ethyl-, propyl-isopropyl-, butyl-, isobutyl-, tertiary-butyl-, methoxyl-, ethoxyl-, amino-, nitro-, carboxyl-, carboxylic acidester-, sulfo- and sulphonic acidester groups and halogen atoms.

The total number of the substituents present on the aromatic hydrocarbon residue is limited to the number of the substitutable hydrogen atoms; therefore, the maximum numbers are for example: for benzene 6, for naphthalene 8 and for diphenyl 10. Its minimum will always be 2 because in accordance with the invention an effective compound will contain at least one poly-branched alkyl residue and at least one ethyleneglycol- or polyethyleneglycol chain. However, the substituent S need not be present.

The compounds can be obtained by the condensation of poly-branched isoolefines from cracking processes—especially low polymerized olefines such as di-, tri- or tetrameric propene, butene, isobutene, butadiene, isoprene etc.—or oligomerides from mixtures of olefines (co-oligomerides) or mixtures thereof with mono- or polynuclear, possibly substituted, phenols such as phenol, cresols, xylenols, naphthols, bis-(hydroxyaryl)-alkanes and -cycloalkanes, such as p,p'-dioxydiphenyldimethylmethane, hydroquinone, pyrocatechine, resorcin, phloroglucine, pyrogallol, p-amino-phenol, thymol, guaiacol, eugonol, orcin, nitrophenols, chromotropic acid, chlorophenols, and citronine A, and the tertiary and quaternary alkylphenols obtained thereby are allowed to interact with ethyleneoxide.

The condensation of the phenols with the branched chain olefines can be accomplished for example by allowing the components to interact—in a manner known per se—in the presence of acid catalyzers or bleaching clay.

The reaction of the tertiary and quaternary alkylphenols with the ethyleneoxide is accomplished smoothly at, for example, between 140 and 200° C.

Compounds prepared in such manner are mixtures of various components. This manufacturing method is particularly advantageous because it has been found that a single, chemically uniform combination of this class does possess an excellent anti-electrostatic effectiveness and is also, to a surprisingly high degree, compatible with polyethylene and will not exude. However, it has been found also that the mixtures of several such compounds will increase still further their compatibility with the polyethylene.

Since the absorption of the ethyleneoxide takes place not uniformly but statistically, the index figure $n$ of the formula given above will indicate only the mean rate of polyaddition of ethyleneglycol chains of diverse length.

Also, the tertiary and quaternary alkyl residues represent as a rule mixtures of a multitude of dissimilar residues. For example, the tripropylene consists of the four main components 4,6-dimethyl-heptene-(2),
4-methylene-5-methyl-heptene,
4,6-dimethyl-heptene-(1),
4,6-dimethyl-heptene-(3)

together with small amounts of other isomerides and compounds with a carbon skeleton which is smaller by one or several carbon atoms.

These four compounds upon phenolalkylation will result in at least five tertiary and quaternary p-nonylphenols, namely p-(1,3,5-trimethylhexyl)-phenol,
p-(2,4-dimethyl-1-ethylpentyl)-phenol,
p-(1,3-dimethyl-1-propylbutyl)-phenol,
p-(4-methyl-2-propylpentyl)-phenol,
p-(4,6-dimethylheptyl)-phenol together with homogenous ortho-derivatives, small amounts of ortho- and para-derivatives with smaller carbon skeletons, and compounds with more than one of the alkyl residues listed which can be unlike in the same molecule.

If the phenolalkylation is accomplished with the fourfold tetrapropylene-isomeride mixture which has a substantially greater variety still, a substantially greater number of unlike alkylphenols is produced because here again the chain will be reduced frequently by one or more carbon atoms during the alkylation, and several like or unlike alkyl residues can enter at the same phenyl residue.

Still more diversified are the products from the polymerization of, e.g., isobutene.

Therefore, the extraordinary number of dissimilar compounds which are obtained even in the normal course of production is increased still further by the ethoxylation which takes place upon the subsequent treatment with ethyleneoxide.

Almost all products from the ethoxylation of a homogenous compound are compatible with polyethylene in concentrations of 10% or more and only a few will begin to exude slightly after several months if used in concentrations of 10% but the mixtures described above are easily compatible with polyethylene even in concentrations exceeding 10%, and they do not show the slightest exudation, even if stored for several years.

Contents of 2 to 5% will guarantee a sufficient anti-electrostatic protection for all practical purposes. Therefore, by addition of these compounds an immediately effective and permanent anti-electrostatic result is attained and any sticking of the surfaces is avoided.

It is also advantageous that in the olefine polymerization and the subsequent preparation of alkylphenols and their ethyleneoxide-adducts no low-boiling first runnings are encountered with the result that the polyethylene can be utilized later on without any danger of bubble formation, eliminating the costly purification process heretofore required in case of the known alkylarylglycols.

The additions proposed by the invention can be mixed as desired not only with each other but also with other anti-electrostatically effective compounds. For example, they are mixable completely with homogenous or mixed ethylene-, propylene- or butyleneglycols of the polyadditive order of 1 to 3000, also with their monoethers, diethers, monoesters, diesters or etheresters, as well as with these compounds consisting of two or more alkylene or polyalkyleneglycol chains, linked through hydrocarbon residues—with the exception of saturated aliphatic hydrocarbon residues with two to four carbon atoms—carboxylic acid, hydrocarboxylic acid, carbonic acid or dicarbonic acid residues; the terminal hydrogen atoms of these compounds can be substituted in whole or part by hydrocarbon or acyl residues. Mixtures of this type are distinguished by their ability to form many and various combinations which will permit advantageous modifications of the properties of the polyethylene while maintaining at all times a high degree of anti-electrostatic effectiveness and excellent compatibility with the polyethylene. The properties include flow stability, rigidity, tendency to become brittle, formation of cracks when aging, ductility, tensile strength, impact strength, yellowing and so on.

The anti-electrostatic additions are compatible with other additions which are mixed frequently with the polyethylenes such as stabilizers, filling material, coloring substances, lubricants, softeners, pigments, extenders, antioxidants and so on. The anti-electrostatic effect will not be impaired by such additions and in many instances it will be increased still further.

*Examples*

In Examples 1 to 4 the mixtures of tertiary and quaternary nonylphenylpolyethyleneglycols contain, aside from small quantities of tertiary and quaternary octyl-, heptyl-, hexyl- and pentyl residues the following tertiary and quaternary nonyl residues:

1,3,5-trimethylhexyl-,
2,4-dimethyl-1-ethylpentyl-,
1,3-dimethyl-1-propylbutyl-,
4-methyl-2-propylpentyl-,
4,6-dimethylheptyl- residues.

In these mixtures the p-compounds are preponderant over the o-compounds. The numbers included in the compounds listed below denote the mean molecular weight of the portion of the compound preceding the number.

*Example 1*

3 g. of a mixture of tertiary and quaternary nonylphenyl-polyethyleneglycol-530 are dissolved in 30 ml. of methanol. The solution is mixed with 97 g. of polyethylene, stirred and the solvent evaporated. From the resulting mixture pressed slabs are made and tested for their anti-electrostatic effectiveness. The slabs will not attract any dust after rubbing with a woolen cloth while slabs made of pure polyethylene will attract a great number of dust particles. The first-mentioned slabs do not show any exudation, even after storage for one year. If the percentage of the mixture of tertiary and quaternary nonylphenylpolyethyleneglycol-530 is raised from 3 to 5, or 10% respectively, the slabs still will not show any exudation after storage for one year.

*Example 2*

1.5 g. of a mixture of tertiary and quaternary nonylphenylpolyethyleneglycol-350 and 1 g. of polyethyleneglycol-3000-monomyristate are homogenized in a high-speed mixer with 97.5 g. of polyethylene. From this mixture pressed slabs are made and tested for their anti-electrostatic effectiveness. The slabs will not attract any dust after rubbing with a woolen cloth. They do not show any exudation even after storage for one and a half years.

If the percentage of the mixture of tertiary and quaternary nonylphenylpolyethyleneglycol-350 is increased from 1.5 to 5, 8 or 10%, thereby increasing the total amount of the anti-electrostatic additions to 6, 9 or 11%, the slabs still will not show any exudation after storage for one year.

*Example 3*

1 g. of a mixture of tertiary and quaternary nonylphenylpolyethyleneglycol-835, 1 g. of butylpolyethyleneglycol-400-capronate and 1 g. of di-(laurylpolyethyleneglycol-935)-adipate are incorporated on rollers into 97 g. of polyethylene. From the mixture so obtained pressed slabs are manufactured and tested for their anti-electrostatic effectiveness. They will not attract any dust after rubbing with a woolen cloth. The slabs do not show any exudation even after storage for one year.

If the percentage of the mixture of tertiary and quaternary nonylphenylpolyethyleneglycol-835 is increased from 1 to 5, 8 or 10%, thereby increasing the total amount of the anti-electrostatic additions to 7, 10 or 12% respectively, the slabs still will not show any exudation after storage for one year.

*Example 4*

2 g. of a mixture of tertiary and quaternary nonylphenylpolyethyleneglycol-1100, .2 g. of polyethyleneglycol-530 and 1.5 g. of polyethyleneglycol-600-dicaprylate are dissolved in 30 milliliters methanol. The solution is mixed with 96.3 g. polyethylene, stirred and the solvent evaporated. Pressed slabs are manufactured from the remaining mixture and tested for their anti-electrostatic effectiveness. The slabs will not attract any dust after rubbing with a woolen cloth while slabs made from pure polyethylene will attract a large number of dust particles. The first mentioned slabs do not show any exudation even after storage for one year.

If the percentage of the mixture of tertiary and quaternary nonylphenylpolyethyleneglycol-1100 is increased from 2 to 5, 8 or 10%, thereby increasing the total amount of the anti-electrostatic additions to 6.7, 9.7 or 11.7% respectively, the slabs will still not show any exudation after storage for one year.

In the same manner and with identical anti-electrostatic effectiveness other mixtures of tertiary and quaternary nonylphenylpolyethyleneglycols and their mixtures with other polyalkyleneglycols compounds can be incorporated in the basic material, for example a mixture of Tertiary and quaternary nonylphenylpolyethyleneglycol-350
Tertiary and quaternary nonylphenylpolyethyleneglycol-440
Tertiary and quaternary nonylphenylpolyethyleneglycol-660
Tertiary and quaternary nonylphenylpolyethyleneglycol-835
Tertiary and quaternary nonylphenylpolyethyleneglycol-1100
Tertiary and quaternary nonylphenylpolyethyleneglycol-1540
2% of a mixture of tertiary and quaternary nonylphenylpolyethyleneglycol-530+1% of stearylpolyethyleneglycol-1590 and 1% of oleylpolyethyleneglycol-1590,
4.5% of a mixture of tertiary and quaternary nonylphenylpolyethyleneglycol-1540+1.5% of cetylpolyethyleneglycol-1125,
1.5% of a mixture of tertiary and quaternary nonylphenylpolyethyleneglycol-530 and 1.5% of laurylpolyethyleneglycol-495,
1.5% of a mixture of tertiary and quaternary nonylphenylpolyethyleneglycol-660+1% of 2-ethylhexylpolyethyleneglycol-835+1% of methylpolyethyleneglycol-1500,
1% of a mixture of tertiary and quaternary nonylphenylpolyethyleneglycol - 835+1% of cyclododecylpolyethyleneglycol - 625+1% of decylpolyethyleneglycol-335+1% of ethylpolyethyleneglycol-270,
2% of a mixture of tertiary and quaternary nonylphenylpolyethyleneglycol - 1100+1% of polyethyleneglycol-1550-mono-palmitate,
3.5% of a mixture of tertiary and quaternary nonylphenylpolyethyleneglycol-835+1% of polyethyleneglycol-600-mono-stearate,
1.5% of a mixture from tertiary and quaternary nonylphenylpolyethyleneglycol-1540+.5% of butylpolyethyleneglycol-300+.5% of polyethyleneglycol-1000-mono-myristate,
7% of a mixture of tertiary and quaternary nonylphenylpolyethyleneglycol-835+1.5% of polyethyleneglycol-1550-mono-myristate+1.5% of polyethyleneglycol-600-mono-caprinate,
1% of a mixture of tertiary and quaternary nonylphenylpolyethyleneglycol - 440+.5% of polyethyleneglycol-600 - mono-stearate+1% of polyethyleneglycol-1000-mono-palmitate+.5% of polyethyleneglycol-400-mono-caprylate,
4% of a mixture of tertiary and quaternary nonylphenylpolyethyleneglycol-530+1% of nonylphenylpolyethyleneglycol-1100+.5% of polyethyleneglycol-600-mono-palmitate+1% of polyethyleneglycol-3000-mono-myristate,
8% of a mixture of tertiary and quaternary nonylphenylpolyethyleneglycol - 530+.5% of polyethyleneglycol-1500-di-stearate+2% of cetylpolyethyleneglycol-1125-capronate,
1% of a mixture of tertiary and quaternary nonylphenylpolyethyleneglycol - 530+.5% of polyethyleneglycol-1000+1% of cetylpolyethyleneglycol - 1125 - capronate+1% of di - (laurylpolyethyleneglycol - 935)-adipate.

Slabs containing these substances do not show any exudation even after storage ranging from one to one and a half years.

In Examples 5 and 6 the mixtures of tertiary and quaternary dodecylphenylpolyethyleneglycols contain, aside from small quantities of undecyl-, decyl-, nonyl-, octyl-, heptyl- and hexyl residues, mainly the following tertiary and quaternary dodecyl residues:

4,6,8-trimethyl-nonyl-,
1,3,5,7-tetramethyl-octyl-,
2,4,6-trimethyl-1-ethylheptyl-,
1,3,5-trimethyl-1-propylhexyl-,
4,6-dimethyl-2-propylheptyl-,
1,2,4-trimethyl-1-butylpentyl-,
1,2-dimethyl-1-isobutylhexyl-,
1,2,4-trimethyl-1-isobutylpentyl- In these mixtures the p-compounds are preponderant over the o-compounds.

*Example 5*

3 g. of a mixture from tertiary and quaternary dodecylphenylpolyenyleneglycol-700 are dissolved in 300 milliliters methanol. The solution is mixed with 97 g. of polyethylene, stirred and the solvent evaporated. Pressed slabs are manufactured from the remaining mixture and tested for their anti-electrostatic effectiveness. They will not attract any dust after rubbing with a woolen cloth while slabs made of pure polyethylene will attract a great number of dust particles. The first mentioned slabs do not show any exudation, even after storage for one year.

If percentages of the mixture from tertiary and quaternary dodecylphenylpolyethyleneglycol-700 are increased from 3 to 5, or 10% respectively, the slabs will still not show any exudation after storage for one year.

*Example 6*

1.5 g. of a mixture of tertiary and quaternary dodecylphenylpolyethyleneglycol-480, 1 g. of polyethyleneglycol-1550-monostearate and 1 g. of laurylpolyethyleneglycol- 495 are homogenized in a high-speed mixer with 96.5 g. of polyethylene. Pressed slabs are made from this mixture and tested for their anti-electrostatic effectiveness. They will not attract any dust after rubbing with a woolen cloth. The slabs do not show any exudation, even after storage for one and a half years.

If the percentage of the mixture of tertiary and quaternary dodecylphenylpolyethyleneglycol-480 is increased from 1.5 to 5, 8 or 10% respectively, thereby increasing the total amount of anti-electrostatic additions to 6, 9 or 11% respectively, the slabs will still not show any exudation after storage for one year.

In the same manner and with identical anti-electrostatic effectiveness other mixtures of tertiary and quaternary dodecylphenylpolyethyleneglycols or their mixtures with other polyalkyleneglycol compounds can be incorporated in the basic material, for example 4% of a mixture of tetrtiary and quaternary dodecylphenylpolyethyleneglycol-480,
2% of a mixture of tertiary and quaternary dodecylphenylpolyethyleneglycol-1580+2% of a mixture of tertiary and quaternary nonylphenylpolyethyleneglycol-530,
6% of a mixture of tertiary and quaternary dodecylphenylpolyethyleneglycol-590+1% of polyethyleneglycol-400-dioenanthate+2% of methylpolyethyleneglycol-1500-stearate,
3% of a mixture of tertiary and quaternary dodecylphenylpolyethyleneglycol-480+1% of polyethyleneglycol-1550-monomyristate+.5% of polypropyleneglycol-300-di-caprylate,
1.5% of a mixture of tertiary and quaternary dodecylphenylpolyethyleneglycol-700+1% of a mixture of tertiary and quaternary nonylphenylpolyethyleneglycol-1465+1% of di(laurylpolyethyleneglycol-495)-succinate,
2% of a mixture of tertiary and quaternary dodecylphenylpolyethyleneglycol-1580+.5% of polyethyleneglycol-1550+1% of polyethyleneglycol-1000-di-stearate.

Slabs containing these substances do not shown any exudation, even after storage for one year.

In Examples 7 and 8 the mixtures of tertiary and quaternary octylphenylpolyethyleneglycols contain, aside from small quantities of heptyl-, pentyl-, butyl- and propyl residues, the following tertiary and quaternary octyl residues:

2,4,4-trimethylpentyl-,
1,1,3,3-tetramethylbutyl-,
2,2-dimethyl-1-isopropyl-propyl.

In these mixtures the p-compounds are preponderant over the o-compounds.

*Example 7*

3 g. of a mixture of tertiary and quaternary octylphenlypolyethyleneglycol-590 are dissolved in 30 milliliters methanol. The solution is mixed with 97 g. of polyethylene, stirred and the solvent evaporated. Pressed slabs are made from the remaining mixture and tested for their anti-electrostatic effectiveness. They will not attract any dust after rubbing with a woolen cloth while slabs made of pure polyethylene will attract a great number of dust particles. The first mentioned slabs do not show any exudation, even after storage for one year.

If the percentage of the mixture of tertiary and quaternary octylphenylpolyethyleneglycol-590 is increased from 3 to 5, or 10% respectively, the slabs will still not show any exudation after storage for one year.

*Example 8*

2 g. of a mixture of tertiary and quaternary octylphenlypolyethyleneglycol-835, 1 g. of cetylpolyethyleneglycol-1125-capronate and 1 g. of di-(laurylpolyethyleneglycol-935)-adipate are incorporated on rollers into 96 g. of polyethylene. Pressed slabs are made from the mixture so obtained and tested for their anti-electrostatic effectiveness. They will not attract any dust after rubbing with a woolen cloth. The slabs do not show any exudation even after storage for one year.

If the percentage of the mixture of tertiary and quaternary octylphenylpolyethyleneglycol-835 is increased from 2 to 5, 8 or 10% respectively, thereby increasing the total amount of anti-electrostatic additions to 7, 10 or 12% respectively, the slabs will still not show any exudation after storage for one year.

In the same manner and with identical anti-electrostatic effectiveness other mixtures of tertiary and quaternary octylpolyethyleneglycols, or their mixtures with other polyalkyleneglycol compounds can be incorporated, for example:

3% of a mixture of tertiary and quaternary octylphenylpolyethyleneglycol-590+1% of a mixture of tertiary and quaternary nonylphenylpolyethyleneglycol-530,
7% of a mixture of tertiary and quaternary octylphenylpolyethyleneglycol-835+.5% of polyethyleneglycol-600-monostearate+1% of polyethyleneglycol-1550-dimyristate+1% of polyethyleneglycol-400-di-methyl-ether,
2% of a mixture of tertiary and quaternary octyl-phenolpolyethyleneglycol-590+1% of butylpolyethyleneglycol-270-laurate+1% of di-(caproylpolyethyleneglycol-1250)-adipate.

Slabs containing these substances do not show any exudation, even after storage for one year.

We claim:

1. An ethylene polymer composition comprising polyethylene and from 0.5 to 10% by weight relative to the polyethylene of an anti-electrostatic agent selected from the group consisting of compounds of the formula

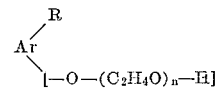

in which Ar is a member selected from the group consisting of aromatic mono- and poly-nuclear hydrocarbon residues, R is a poly-branched aliphatic, saturated alkyl residue containing from 5 to 12 carbon atoms and $n$ is a whole number from 1 to 1000.

2. A composition as defined in claim 1 comprising in addition to said anti-electrostatic agent at least one compound selected from the group consisting of ethylene-, propylene- and butylene glycols of the polyaddition order of from 1 to 3000 and their mono-ethers, di-ethers, mono-esters, di-esters and ester-ethers and compounds consisting of at least two alkylene and polyalkylene glycol chains bonded to carboxylic acid-, hydroxy-carboxylic acid, carbonic acid and dicarboxylic acid residues through hydrocarbon groups other than saturated aliphatic hydrocarbon groups containing from 2 to 4 carbon atoms.

References Cited by the Examiner
UNITED STATES PATENTS

| | | | |
|---|---|---|---|
| 2,579,375 | 12/1951 | Eisen | 260—33.2 |
| 2,759,015 | 8/1956 | Zech | 260—31.4 |
| 2,879,244 | 3/1959 | Coler | 260—33.2 |
| 2,978,431 | 4/1961 | Engle | 260—33.2 |
| 2,993,022 | 7/1961 | Coler | 260—33.2 |

FOREIGN PATENTS 921,032    3/1963    Great Britain.

MORRIS LIEBMAN, *Primary Examiner.*